United States Patent

Haller et al.

[15] 3,656,834
[45] Apr. 18, 1972

[54] ADDITIVE FOR LIQUID CRYSTAL MATERIAL

[72] Inventors: Ivan Haller, Chappaqua; Harold A. Huggins, White Plains, both of N.Y.

[73] Assignee: International Business Machines Corporation, Armonk, N.Y.

[22] Filed: Dec. 9, 1970

[21] Appl. No.: 96,369

[52] U.S. Cl. ............................ 350/150, 252/408, 350/160
[51] Int. Cl. ............................................................ G02f 1/16
[58] Field of Search ................ 350/150, 160 LC; 252/408

[56] References Cited

UNITED STATES PATENTS 3,597,043  8/1971  Dreyer .................................. 350/150
3,597,044  8/1971  Castellano ........................... 350/160

*Primary Examiner*—Ronald L. Wibert
*Assistant Examiner*—Edward S. Bauer
*Attorney*—Hanifin and Jancin and Isidore Match

[57] ABSTRACT

A nematic liquid crystal material which assumes a homeotropic texture is provided by dissolving an additive material having the formula $$RR_3'N^+X^-$$

wherein R is an alkyl radical having 10 to 24 carbon atoms, R' is a methyl or ethyl radical, and $X^-$ is an anion derived from a simple acid, in a nematic material. A typical example of the additive is hexadecyltrimethylammonium bromide. The homeotropic texture provided by this composition, when placed between two conducting transparent plates, is readily deformed by a voltage applied to the plates and can thereby be utilized to control the transmission of light.

10 Claims, 4 Drawing Figures

PATENTED APR 18 1972   3,656,834

INVENTORS
IVAN HALLER
HAROLD A. HUGGINS

BY Isidore Match

ATTORNEY

ADDITIVE FOR LIQUID CRYSTAL MATERIAL

BACKGROUND OF THE INVENTION

This invention relates to liquid crystals. More particularly, it relates to novel liquid crystal compositions wherein the orientation of films thereof can be controlled. It is concerned with nematic liquids which are a type of liquid crystals, the other two types being smectic and cholesteric.

Nematic liquids are characterized by a structure which results from the parallel orientational ordering of the longitudinal axes of the rod-like molecules which constitute these liquids. Such ordering obtains for distances which are substantially greater than the molecular dimensions but the size and arrangement of regions of uniform orientation are greatly influenced by the boundary surfaces. Nematic liquid crystals are anisotropic in their optical, electrical and magnetic properties. Since the forces responsible for the orientational order are much smaller than the corresponding forces responsible for the structure of solids, the detailed structure of a nematic liquid is more readily influenced by external agencies of such electric and magnetic fields. This property gives rise to pronounced electro-optical effects which can be advantageously employed in display devices.

The employment of nematic liquids as an electro-optical element for modulating light or displaying light is set forth in U.S. Pat. 3,322,485 that issued to Richard V. Williams on May 30, 1967. A liquid crystal display element is disclosed in U.S. Application of Marvin J. Freiser and Ivan Haller for "Liquid Crystal Display Element", Ser. No. 875,235 filed Nov. 10, 1969.

In the absence of external aligning influences, the direction of the orientational order in a nematic liquid, i.e. the direction of the optic axis varies randomly from place to place. The variation is generally both continuous and abrupt; the location of abrupt changes in orientation being termed disinclination lines. In the vicinity of a boundary surface, the orientation direction of the liquid crystal is determined by the nature and past history of the surface. For example, most nematic liquids in contact with an untreated glass surface orient in the surface layer with the long axis of the molecules lying in the plane of the surface. The orientation direction in the plane varies, however, from point to point, subdividing the surface into random regions or domains of different orientation.

When a nematic liquid is placed between two surfaces, spaced apart about 10–1000 microns, it exhibits one of several kinds of characteristic birefringence patterns, termed textures. These textures can be observed visually at low magnification between crossed polarizers. They result from the variation of the optic axis direction in the nematic layer which in turn is determined by the orientational domain pattern of the bounding surface as well as the deformational characteristics of the liquid itself. For example, most nematic liquid crystals, when enclosed between two untreated glass surfaces, exhibit a threaded texture. The threads in this texture have their origin in the disinclination lines while the remainder of the texture originates in the continuous variation in the optic axis direction in the bulk to accommodate the optic axis directions in the boundary layer imposed by the glass. Another example is the homogeneous, or aligned, texture, which is characterized by the optic axis' pointing uniformly in a predetermined direction but lying in the plane of the boundary surface. This texture is prepared by surface treatments such as rubbing prior to the enclosure of the liquid crystal.

It is often desirable for device applications and in the measuring of certain physical properties to provide a nematic layer in a homeotropic texture, i.e., large areas in which the optic axis is oriented perpendicularly to the boundary. Heretofore, homeotropic texture layers have been prepared by pretreating the surfaces which subsequently enclose the nematic layer with a strongly oxidizing acid such as nitric or chromesulfuric acid. This technique has been found to be undesirable in many situations because it cannot be used with oxidation-sensitive (transparent conductive coated) surfaces. Particular care is required to avoid the touching of a surface so treated, and homeotropic nematic layers produced by this technique tend to be unstable, i.e., their homeotropic property tends to decrease in an undesirably short period.

Accordingly, it is an important object of this invention to provide a nematic liquid crystal material, which as a layer between two bounding surfaces, assumes a homeotropic texture without the need for chemically pretreating the bounding surfaces.

It is another object to provide a nematic liquid crystal material in accordance with the preceding object which, when subjected to an applied electric field acting upon the dipole component perpendicular to the long axis of the molecules, deforms the homeotropic texture.

It is a further object to provide an improved electro-optical element suitable for use in light modulators, optical storage or displays and the like employing the nematical liquid crystal material at the inventory.

SUMMARY OF THE INVENTION

Generally speaking and in accordance with the invention, there is provided a nematic liquid crystal material which assumes a homeotropic texture comprising a nematic material having dissolved therein a material having the formula:

$$RR_3'N^+X^-$$

wherein R is selected from group consisting of alkyl radicals having 10 to 24 carbon atoms, R' is selected from the group consisting of methyl and ethyl and X⁻ is selected from the group consisting of anions derived from simple acids.

Typical examples of nematic materials may be such compounds as p-methoxybenzylidene-p-butylaniline, p-methoxybenzylidene-p-aminophenylacetate, p-azoxyanisol and butyl-p-(p-ethoxyphenoxycarbonyl)-phenylcarbonate. A suitable example of R may be a hexadecyl radical. The anion may be a halide ion such as Cl⁻, Br⁻, I⁻, or an anion derived from oxy-acids such as No₃⁻ 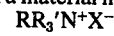 and the like. A typical example of the material symbolized by the structural formula may be hexadecyltrimethyl-ammonium bromide which may be present in its solution in the nematic material in a range of 0.25 to 2.5 percent depending, of course, on its solubility characteristics relative to the specific nematic material which is employed.

The foregoing and other objects, features, and advantages of the invention will be apparent from the following more particular description of the preferred embodiments of the invention.

DESCRIPTION OF A PREFERRED EMBODIMENT

Figure 1:
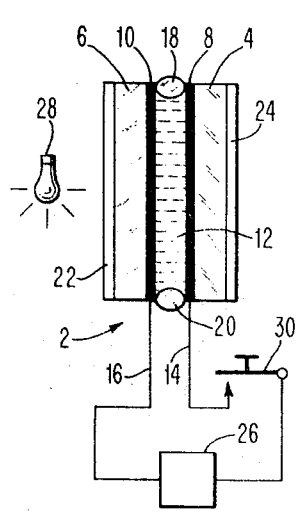
FIG. 1 is a schematic depiction of an improved nematic cell incorporating the material according to the invention.

In accordance with the invention, it has been discovered that the dissolving of a small percentage of a material such as hexadecyltrimethyl ammonium bromide in nematic materials causes them to assume a homeotropic texture between glass slides, even in the absence of any treatment or cleaning of surfaces.

The additive of a specific molecular shape forms on the enclosing surface an adsorbed monolayer of a specific molecular orientation. This monolayer then transmits a sense of perpendicular orientation to adjacent layers of liquid crystalline molecules. In this connection, it is believed that the polar molecules of the additive are preferentially adsorbed on the polar surface. They are so adsorbed in a manner that maximizes the energy of interaction that is in an orientation that permits the nitrogen atom which carries the positive charge to reside at a minimum distance from the surface. By virtue of the known tetrahedral arrangement of bonds around the quaternary nitrogen atom, this requires the three small R' radicals to be in contact with the surface and the larger R radical to reside on the side of the nitrogen atom opposite to the surface and to point, in an elongated conformation, perpendicular to the surface. Molecules of the liquid crystal that predominate in the second and subsequent layer, are kept, by molecular forces, parallel to the long alkyl chains of the adsorbed layer and, consequently, are perpendicular to the boundary surface.

It has been found that a nematic material such as p-methoxybenzylidene-p-butylaniline, a room temperature nematic material, containing 0.49 percent by weight of the above-mentioned hexadecyltrimethyl ammonium bromide additive exhibits an almost perfect homeotropic texture. Homeotropy has also been produced with the latter ammonium compound where the nematic material which is employed is p-methoxybenzylidene-p aminophenylacetate containing 0.96 percent of the additive. The nematic material p-azoxyanisol containing 0.48 percent of the additive showed a homeotropic texture in the temperature range of approximately 2°C below the nematic isotropic transition temperature. The nematic material butyl-p-(p-ethoxyphenoxy carbonyl) - phenylcarbonate having the additive dissolved therein also showed homeotropy.

Among the advantages presented by the achieving of homeotropy with an additive as opposed to the method of treating the bonding surfaces with oxidizing acids are the following:

1. Oxidation-sensitive transparent conductive surfaces can be used.
2. No special care is required to avoid the touching of the treated surface.
3. The stability of the treated surface relative to time of the homeotropic surface shows superior qualities.

A display element utilizing a homeotropic nematic liquid crystal material made according to the invention, can be provided by enclosing the latter material between tin-oxide coated, i.e., conductive, plates of a transparent material such as glass or plastic and viewing the structure between crossed polarizers in transmitted light. In the absence of an electric field, the device appears dark as the optic axis of the material lies in the propagation direction of the light. An applied electric field acting upon the dipole component perpendicular to the long axis of the molecule deforms the homeotropic texture. As the optic axis no longer lies in the propagation direction, the light is depolarized and the element appears bright.

There follows hereinbelow a detailed description of the making and testing of the inventive homeotropic nematic material.

EXAMPLE 1

An 0.49 percent solution of hexadecyltrimethyl ammonium bromide in p-methoxybenzylidene-p-butylaniline was prepared by mixing 0.0024 and 0.495 grams, respectively, of the materials in a vial, heating to a temperature where the nematic liquid first turned isotropic (approximately 46°C) and shaking until the last specks of the solid mass dissolved. A drop of the solution at room temperature was placed between untreated glass plates whose separation was effected by a 2-mil thick teflon gasket. The sample was then examined between crossed polars on a polarizing microscope over its entire nematic temperature range and extinction was observed independently of the direction of the sample relative to the polarization direction. Upon the shearing of the liquid crystal by selective motion of the two plates, light was observed to be transmitted. These observations indicated that the optic axis of the nematic fluid, at rest, is perpendicular to the glass plates, i.e., because of the additive, it assumed a homeotropic texture.

In a second experiment, the same procedure as described above was followed with the exception that the glass slides which were employed were first repeatedly rubbed on a cheese cloth in a given direction. Such rubbing treatment is known to normally cause pure p-methoxybenzylidene-p-butylaniline, which is subsequently enclosed, to assume a texture in which the optic axis lies in the plane of the glass and in the rubbing direction. The inventive solution, as described hereinabove, however, was again observed to assume the hometropic texture.

In a third experiment, the same solution was enclosed between electrically conducting tin oxide-coated glass plates wherein it again exhibited a homeotropic texture. A dc voltage was then applied to the plates, while the appearance of the sample was monitored on the polarizing microscope and the intensity of the transmitted light (between crossed polarizers) was measured with a CdS photocell replacing one of the eyepieces of the binocular microscope. With an applied voltage of 0 to 5 volts, the structure appeared uniformly dark. At 7.5 volts however, the liquid crystal material became transparent and, under magnification, it appeared stationary.

The contrast ratio, i.e., transmitted light intensity at 7.5 volts relative to that at zero volts was found to be 16. With applied voltages of 10 volts or higher, flow patterns and turbulence appeared similar to those patterns and turbulence observed in nematic materials of any texture. The maximum contrast which was achieved was 31 at an applied voltage of 24 volts. In a comparison, the maximum contrast ratio measured under similar conditions, of elements containing nematic liquid crystals with no additive, and aligned in the plane of the boundary surfaces in the polarization direction was found to be only 11 to 17.

EXAMPLE 2

Hexadecyltrimethylammonium bromide was dissolved in butyl-p-(p-ethoxyphenoxy carbonylphenyl carbonate in a concentration of 0.4 to 1.1 percent by weight, to provide the inventive nematic liquid crystal material.

EXAMPLE 3

Hexadecyltrimethylammonium bromide was dissolved in p-methoxybenzylidene-p-aminophenyl acetate in a concentration of 0.4 to 1.1 percent by weight to provide the inventive nematic liquid crystal material. A sample containing 0.95 percent of the additive showed particularly good results when tested.

EXAMPLE 4

Hexadecyltrimethylammonium bromide was dissolved in p-azoxyanisol in a concentration of 0.48 percent by weight to provide the inventive nematic liquid crystal material.

The testing of the samples produced in Examples 2, 3, and 4 followed the same procedures as set forth in Example 1, and similar good results were obtained.

Referring now to the drawings wherein there is illustrated an improved nematic cell utilizing the nematic material prepared according to the invention, the electro-optical device 2 of FIG. 1 comprises two transparent substrates 4 and 6, such as glass or other inert material having good light transmissive characteristics. The substrates 4 and 6 have plane opposed parallel faces on which there are deposited electrically conductive light-transparent electrodes 8 and 10, of the order of 1000 –3000A in thickness. There are many materials that can be employed for making such electrodes; tin oxide being one of these suitable materials.

The spacing between electroded glass plates 4 and 6 is between 10 – 1000 microns, this spacing being maintained by shims, raised bevels on the opposed parallel plates 4 and 6, or by any other suitable means. Although capillary action will be sufficient to maintain liquid crystal 12 in the thin space between electrodes 8 and 10, after electrical leads 14 and 16 have been connected to electrodes 8 and 10, respectively, molten glass heads 18 and 20 can be dropped over the spacings to prevent loss of fluid. Secured to the outer surfaces of each glass plate 6 and 4 are crossed polarizers 22 and 24. A dc or relatively low frequency (up to several kilocycles) potential source is connected to leads 14 and 16.

Figure 2:
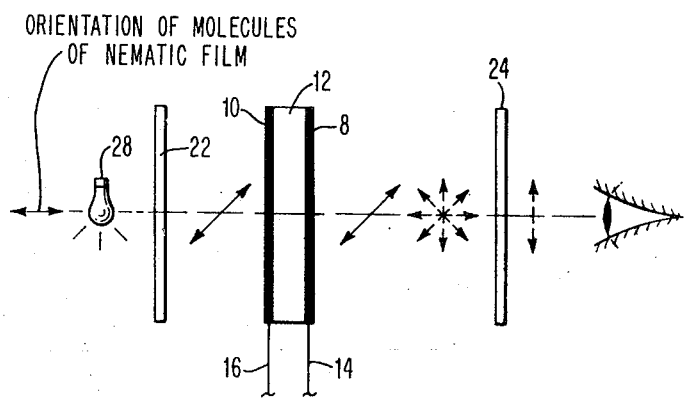
FIG. 2 is a diagram which illustrates changes in polarization of light passing through the cell for two states of the cell.

Reference is now made to FIG. 2 which is of assistance in the explanation of the operation of the arrangement shown in FIG. 1. In this operation, let it be assumed that a diffused light source 28 is observed through cell 2 at a location in front of cell 2 as shown. Such diffused light 28, when passing through polarizer 22, will become polarized in a direction parallel to the plane of the drawings. Upon passing through the nematic liquid 12 in its quiescent state (switch 30 is open and no voltage is across electrodes 8 and 10), the light remains polarized in the plane of the paper. However, since polarizer or analyzer 24 is crossed with polarizer 22, such polarized light does not pass through analyzer 24 and the observer sees a dark background despite the presence of ambient light in the neighborhood of cell 2.

Figure 3:
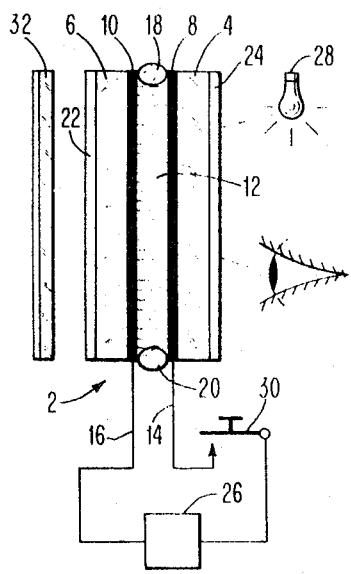
FIG. 3 is a modification of the cell of FIG. 1 for use with reflected light.
Figure 4:
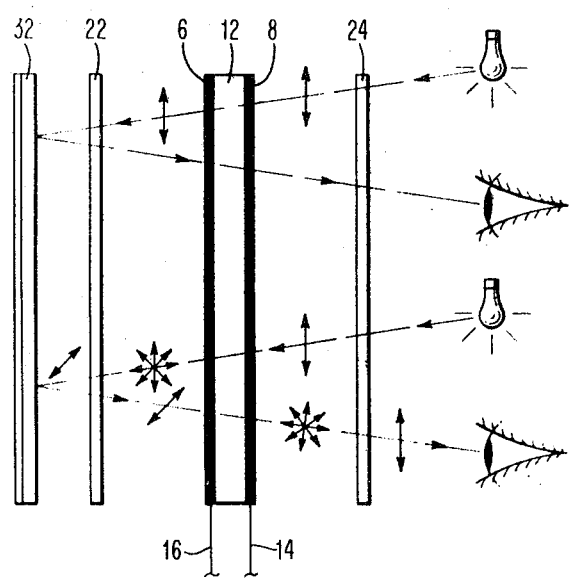
FIG. 4 illustrates the changes in polarization of light for the two states of the cell of FIG. 3.

The embodiment of FIG. 3 is similar to the cell of FIG. 1 with the difference that the polarized light that traverses cell 2, impinges on a mirror 32, and then returns through the cell back to the eye of the observer. As seen in FIG. 4, the diffused light source 28 enters cell 2 from the same side of the observer. Such diffused light, on passing through analyzer 24, becomes polarized perpendicular to the plane of the drawing. With switch 30 closed, the polarized light traverses cell 2 unchanged, but is unable to pass through polarizer 22 that is crossed with polarizer 24. Consequently, no light is reflected from mirror 32, whereby the observer sees cell 2 as an opaque background. When switch 30 is closed so as to activate cell 2, as seen in the bottom portion of FIG. 4, diffused light source 28 becomes polarized perpendicularly to the plane of the drawing as it passes through polarizer 24, but is depolarized after passing through the now activated cell 2. Such depolarized light, upon passing through polarizer 22, becomes polarized in the plant of the drawing and remains so polarized after reflection from mirror 32 and passage again through polarizer 22. The polarized light is again depolarized upon its passage through active cell 2 and becomes depolarized again, exiting from analyzer 24 as light that is polarized at right angles to the plane of the paper and observable by the viewer.

The horizontal lines in nematic material 12 are intended to schematically indicate that the nematic material being used in the devices of FIGS. 1 and 3 is the material prepared according to the invention as described hereinabove. The material 12 has a threshold electric field which, when exceeded, causes the deformation of the homeotropic texture and thereby the depolarization of polarized light passing therethrough. When an electric field is applied across the nematic crystal material which exceeds that threshold, depolarization of polarized light passing therethrough takes place.

While the invention has been particularly described with reference to preferred embodiments thereof, it will be understood by those skilled in the art that the foregoing and other changes in form and details may be made therein without departing from the spirit and scope of the invention.

What is claimed is:

1. A nematic liquid crystal material which assumes a homeotropic texture comprising:
a nematic material having dissolved therein an additive having the formula $RR_3'N^+X^-$ wherein R is selected from the group consisting of alkyl radicals having 10 to 24 carbon atoms, R' is selected from the group consisting of ethyl and methyl, and $X^-$ is selected from the group consisting of anions derived from simple acids.

2. A nematic liquid crystal material which assumes a homeotropic texture comprising:
a nematic material having dissolved therein a material having the formula $R(CH_3)_3N^+X^-$ wherein R is selected from the group consisting of alkyl radicals having 10 and 24 carbon atoms and $X^-$ is selected from the group consisting of anions derived from simple acids.

3. A nematic liquid crystal material which assumes a homeotropic texture comprising:
a nematic material having dissolved therein hexadecyltrimethylammonium bromide.

4. A nematic liquid crystal material as defined in claim 3 wherein said nematic material is selected from the group consisting of p-methoxybenzylidene-p-butylaniline, p-methoxybenzylidene-p-aminophenylacetate, p-azoxyanisol and p-(p-ethoxyphenoxycarbonyl)-phenyl carbonate.

5. A nematic liquid crystal material as defined in claim 4 wherein said hexadecyltrimethylammonium bromide is about 0.25 to 2.5 percent by weight of its solution in said nematic material.

6. A nematic liquid crystal material which assumes a homeotropic texture comprising about an 0.49 percent solution of hexadecyltrimethylammonium bromide in p-methoxybenzylidine-p-butylaniline.

7. An electro-optical display device comprising:
two parallel transparent members spaced apart from 10 – 1000 microns;
transparent electrodes on the facing surfaces of said members;
a nematic liquid crystal material interposed and filling the space between said electrodes and having a homeotropic texture, said nematic liquid crystal material comprising a nematic material having dissolved therein an additive having the formula $RR_3'N^+X^-$ wherein R is selected from the group consisting of alkyl radicals having 10 to 24 carbon atoms, R' is selected from the group consisting of ethyl and methyl, and $X^-$ is selected from the group consisting of anions derived from simple acids;
two crossed polarizers located adjacent said transparent members, each polarizer located on the outer surface of its respective transparent member; and
an electrical potential source connected to said electrodes and adapted to apply a voltage to said electrodes.

8. An electro-optical display device comprising:
two parallel transparent members spaced apart about 10 – 1000 microns;
transparent electrodes on the facing surfaces of said members;
a nematic liquid crystal material interposed and filling the space between said electrodes and having a homeotropic texture, said nematic liquid crystal material having a threshold electric field which, when exceeded, causes deformation of said homeotropic texture and, thereby, depolarization of polarized light passing through, said nematic liquid crystal material comprising a nematic material having dissolved therein an additive having the formula $RR_3'N^{+4x-}$ wherein R is selected from the group consisting of alkyl radicals having 10 to 24 carbon atoms, R' is selected from the group consisting of ethyl and methyl, and $X^-$ is selected from the group consisting of anions derived from simple acids;
two crossed polarizers located on the outer surface of its respective transparent member; and
means for applying an electric field across nematic liquid crystal material through said electrodes that exceeds said threshold electric field.

9. An electro-optical display device comprising:
two parallel transparent members spaced apart between 10 – 1000 microns;
transparent electrodes on the facing surfaces of said members;
a nematic liquid crystal material interposed and filling the space between said electrodes and having a homeotropic texture, said nematic liquid crystal material comprising a nematic material having dissolved therein an additive having the formula $RR_3'N^+X^-$ wherein R is selected from the group consisting of alkyl radicals having 10 to 24 carbon atoms, R' is selected from the group consisting of ethyl and methyl, and $X^-$ is selected from the group consisting of anions derived from simple acids;

two crossed polarizers located adjacent said transparent members, each polarizer located on the outer surface of its respective transparent member;

a mirror adjacent one of said polarizers; and an electrical potential source connected to said electrodes and adapted to apply a voltage to said electrodes.

10. An electro-optical display device comprising:

two parallel transparent members spaced apart between 10 – 1000 microns;

transparent electrodes on the facing surfaces of said members;

a nematic liquid crystal material interposed and filling the spaces between said electrodes and having a homeotropic texture, said nematic liquid crystal material having a threshold electric field which, when exceeded, causes deformation of said texture and thereby depolarization of polarized light passing therethrough;

said nematic liquid crystal material comprising a nematic material having dissolved therein an additive having the formula $RR_3'N^+X^-$ wherein R is selected from the group consisting of alkyl radicals having 10 to 24 carbon atoms, R' is selected from the group consisting of ethyl and methyl, and $X^-$ is selected from the group consisting of anions derived from simple acids;

two crossed polarizers located adjacent said transparent members, each polarizer located on the outer surface of its respective transparent member;

a mirror adjacent one of said polarizers; and means for applying an electric field across said nematic liquid crystal material through said electrodes that exceeds said threshold electric field.

\* \* \* \* \*